(12) United States Patent
Jones et al.

(10) Patent No.: US 7,539,293 B2
(45) Date of Patent: *May 26, 2009

(54) TELEPHONE CONTROLLED ENTERTAINMENT

(75) Inventors: Reese M. Jones, San Francisco, CA (US); Jesper F. Schultz, San Francisco, CA (US); Adam D. Breindel, Sausalito, CA (US)

(73) Assignee: Voice Media Labs, Inc., Vacaville, CA (US)

( * ) Notice: Subject to any disclaimer, the term of this patent is extended or adjusted under 35 U.S.C. 154(b) by 1047 days.

This patent is subject to a terminal disclaimer.

(21) Appl. No.: 10/752,219

(22) Filed: Jan. 6, 2004

(65) Prior Publication Data

US 2004/0194148 A1 Sep. 30, 2004

Related U.S. Application Data

(63) Continuation of application No. 10/211,979, filed on Aug. 1, 2002, now Pat. No. 6,697,467.

(51) Int. Cl.
*H04M 11/02* (2006.01)
*H04N 7/173* (2006.01)

(52) U.S. Cl. .......................... 379/102.03; 379/102.01; 379/102.02

(58) Field of Classification Search ............ 379/102.03, 379/102.01, 102.02, 106.01, 67.1, 88.01, 379/93.27, 93.18, 110.01, 433.07, 368; 704/270.1, 704/219, 275, 203
See application file for complete search history.

(56) References Cited

U.S. PATENT DOCUMENTS

| | | | |
|---|---|---|---|
| 5,153,875 A | 10/1992 | Takatori | 370/32.1 |
| 5,884,262 A | 3/1999 | Wise et al. | 704/270 |
| 2001/0043684 A1 | 11/2001 | Guedalia et al. | 389/88.17 |
| 2002/0048224 A1 | 4/2002 | Dygert et al. | 369/1 |
| 2002/0159571 A1 | 10/2002 | Stock | 379/88.02 |

FOREIGN PATENT DOCUMENTS

EP 1124368 A1 8/2001

*Primary Examiner*—Melur Ramakrishnaiah
(74) *Attorney, Agent, or Firm*—Van Pelt, Yi & James LLP

(57) ABSTRACT

A system and method are disclosed for providing controlling the presentation of information using a telephone including monitoring a signal received from the telephone; receiving control information sent from the telephone; interpreting the control information; generating commands based on the control information; sending the commands to a media source wherein the media source outputs information based on the command; and displaying the information output from the media source on a device separate from the telephone.

37 Claims, 11 Drawing Sheets

| "Thumbs up" 1 | Volume up 2 | "Thumbs down" 3 |
|---|---|---|
| Rewind 4 | Play / pause 5 | Fast forward 6 |
| Mute 7 | Volume down 8 | Stop 9 |
| Activation key * | Launch disk 0 | Disconnect # |

200

| Home 1 | Up 2 | Page up 3 |
|---|---|---|
| Left 4 | Enter 5 | Right 6 |
| End 7 | Down 8 | Page down 9 |
| Activation key * | Select 0 | Select all # |

TELEPHONE CONTROLLED ENTERTAINMENT

FIELD OF THE INVENTION

The present invention relates generally to entertainment systems. More specifically, a telephone controlled entertainment system is disclosed.

BACKGROUND OF THE INVENTION

The popularity of home entertainment is ever increasing, and the demand for readily available content is greater than ever. Many of today's homes are equipped with multiple electronic entertainment devices for displaying audio, video, graphics, text, images, etc. from a variety of sources and formats. At the same time, personal computers have been gaining popularity as storage and playback devices for various media formats.

Most of the electronic entertainment devices have some form of remote control. However, as the number of devices goes up, managing multiple remote controls has become a challenge for most users who wish to get to the content they want easily and quickly. Universal remote controls are one solution to this problem. However, many of the existing remote controls are hard to use due to the numerous buttons designed to accomplish various special tasks. Some universal remote controls are more minimal in button design but requires the user to program specialized "macros" to accomplish different tasks. There are also attempts of universal remote control design with voice recognition, but so far the devices have the same problem of being hard to program and only have a limited set of functions.

Furthermore, existing universal remote controls operate within a limited range of the controlled devices. It is useful to allow the user to access certain devices when the user is away from where the device is located. For example, the user may wish to set his recording devices while away from home.

It is useful to consolidate the functions of various electronic entertainment devices and provide the user easy access to the contents, without having an additional remote control to a household already cluttered with them. It is also useful to provide more advanced functions to help the users manage their media contents. It is also desirable to overcome the range limitations of the existing universal remote controls to allow the user to access the devices remotely.

BRIEF DESCRIPTION OF THE DRAWINGS

The present invention will be readily understood by the following detailed description in conjunction with the accompanying drawings, wherein like reference numerals designate like structural elements, and in which:

FIG. 2 illustrates one example of how the telephone keypad is mapped to various control functions.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A telephone controlled media system is disclosed. In one embodiment, the system uses a telephone connected to a computer to control a media source. The media source outputs information based on commands sent from the telephone. In one embodiment, the outputs are displayed on a device separate from the telephone. In one embodiment, the telephone has display capabilities and the outputs are displayed on the telephone itself The control system allows for voice activated selection of programming as well as overlaying commands input using the telephone buttons during a regular telephone call. The system supports advanced features for managing the user's media content.

Figure 1:
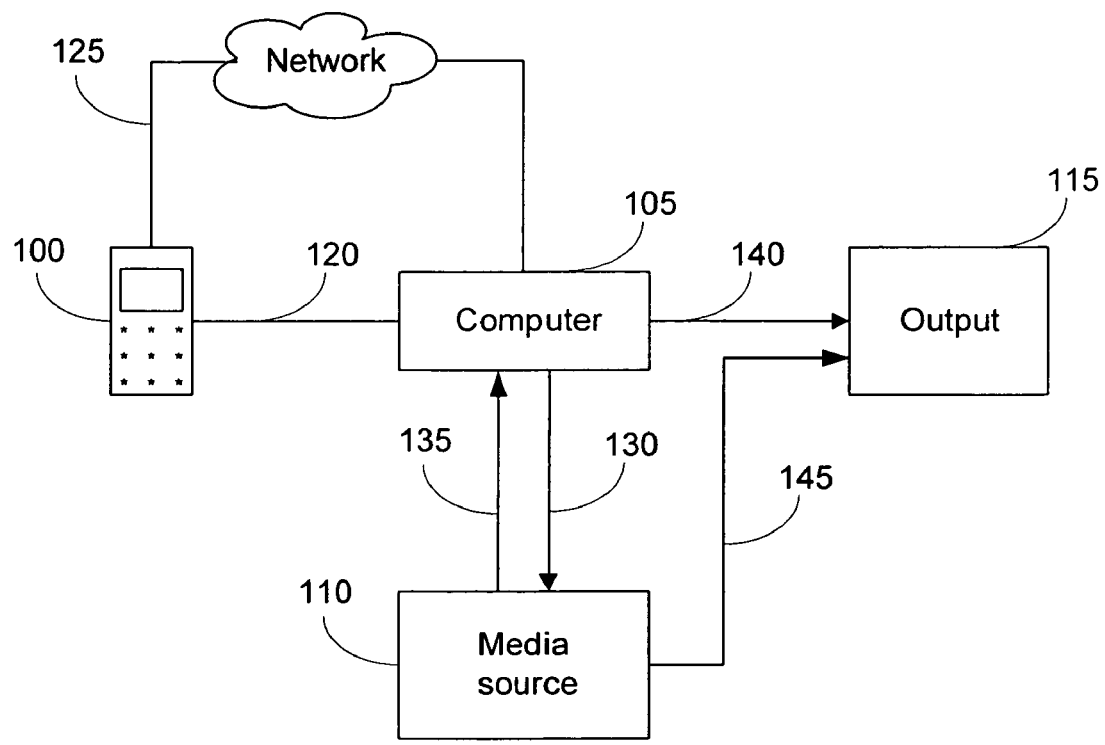
FIG. 1 is a block diagram illustrating a telephone controlled media playback system.

FIG. 1 is a block diagram illustrating a telephone controlled media playback system. Element 100 is a telephone connected to computer 150 via a direct connection 120 or a networked connection 125. The telephone and the computer may have one of the two connections or both or may have another appropriate connection. There may be multiple instances of telephone 100 in the system.

Connection 120 is a direct connection, which can be wireless, wired, or a combination of both. In one embodiment, telephone 100 is a cordless phone, this connection may be a wire line between the base unit (not shown) and the computer, or a wireless connection between the telephone and the base unit.

Connection 125 is a networked connection, where the telephone and the computer are connected via a network that routes signals between them. In one embodiment, the network includes a phone switch that connects between the phone and the computer. In one embodiment, the network includes a voice over IP gateway that connects the phone to the Internet, and the computer is also connected to the Internet. In one embodiment, the network may be a public switched telephone network (PSTN), a private branch exchange (PBX), a cellular network, or a combination thereof, and the computer is connected to a telephone service that connects to the network. In one embodiment, the user connects to the computer by dialing up a telephone number associated with the computer. In other embodiments, the telephone may be connected to the computer via other means.

The computer is used to interpret control information and route output signals. In some embodiments, its functions are built into a processor within the telephone. Thus, no separate computer is necessary and connections 120 and 125 are not needed for these embodiments. For the purposes of this specification, a computer separate from the telephone is discussed, although the computer's functions can be built into the phone.

Control information (also referred to as instructions) is sent from the telephone to the computer. After the computer decodes the control information, it sends commands corresponding to the control information to a media source 110. The media source comprises one or more devices for storing and/or outputting information. Examples of such devices include CD/DVD jukebox, CD player, DVD player, VCR, DVR, memory or storage device within the computer, storage external to the computer, other computers, MP3 players, satellite and cable receivers. The media source can be separate from the computer, or a part of the computer.

Connection 130 between computer 105 and media source 110 can be a wire line connection, a wireless connection, a connection via a network, a combination thereof, or any other suitable connection. In one embodiment, the computer is equipped with an infrared control and sends the commands via infrared signals to the infrared receivers on the media source. In other embodiments, the media source and the computer are connected to an Ethernet network or other type of network.

After the media source receives the commands, it retrieves the information corresponding to the command, and sends the information either to the computer or to output element 115. The information includes audio, video, graphics, text, images, etc. Element 115 comprises one or more devices capable of displaying the information received. Examples of such devices include speakers, television sets, monitors, plasma displays, etc. In one embodiment, the information retrieved by the media source is first sent to the computer via connection 135, and then the computer forwards the information to audio/video output 115 via connection 140. In one embodiment, the information is sent by the media source directly to output 115 via connection 145. In certain embodiments, the information is sent from the media source simultaneously to the computer via connection 135 and to the output via link 145. Connection 135, 140 and 145 can be direct links or wireless links. In one embodiment, the connections are infrared connections. Connections 130, 135, 140 and 145 are protocol independent, as long as the devices can communicate with each other via these connections. In some embodiments, the information is sent from the media source to the telephone, which has the capability to display the information received.

Output element 115 can also be used to output feedback information for the user after the user sends a set of control information. Examples of feedback information include status information, error messages, search results, etc. The information is displayed on its own, or overlaid on top of the output originated from the media source. The feedback information displayed can be text, graphics, images, video, sound or combinations thereof. Examples of information displayed include category information, search results, content listings, virtual keypad, etc. In one embodiment, the feedback information is also sent to the telephone.

The user sends control information to the computer using voice, keypad on the telephone, or input devices associated with the telephone such as touch screen, navigation keys, etc. In one embodiment, voice instructions are sent by the telephone to the computer, via connection 120 or 125. The computer has voice recognition software that captures the voice signal and decodes the information. In one embodiment, the telephone has voice recognition software that captures the voice signal and decodes the information. In one embodiment, the control information is entered using the keys on the telephone and sent to the computer using signals appropriate for communication, for example analog signals, digital signals, optical signals, or dual tone multi-frequency (DTMF) tones. The computer software captures the electrical signals and decodes the information. In one embodiment, a server accessible via a network decodes voice information for the system. In certain embodiments, the control information is sent as a combination of both voice and key entry, e.g., the user can say a movie title to select the content, and then hit a key on the phone for playing the movie. In some embodiments, the user uses voice to control the system, and the telephone is omitted. Instead, a microphone is used for inputting voice commands.

The key based entries can be overlaid on top of the regular voice transmission without affecting the normal operations of the telephone. For example, the user can be in the middle of a normal telephone conversation, and at the same time pressing keys on the telephone for selecting song titles and playing them.

When the user chooses to use the keypad for sending control information, a virtual keypad can be displayed on output device 115 indicating the mapping of the keys to their corresponding functions. FIG. 2 illustrates one example of how the telephone keypad is mapped to various control functions. In other embodiments, the keys may be mapped to different functions. While the figure shows the functions as words in this embodiment, the keys may be shown as icons corresponding to their functions. Other functions are mapped to keys in various embodiments, including, for example, a show or hide on screen display function and a next chapter/next track and previous chapter/previous track function that may be included with or separated from the fast forward and rewind functions.

Phone control functions may also include activating and navigating a DVD disk menu and navigating and modifying a queue of media items. Voice commands may be used in addition to key commands to execute play/pause/stop or other media control functions and to skip to a track or chapter number.

The twelve standard keys on the telephone are mapped to various functions. In keypad 200, the star key (*) is a special activation key. In this embodiment, the activation key needs to be pressed first to put the system in a mode ready for receiving control information, before the user can use the 0-9 and pound keys for their special functions. 1 and 3 keys correspond to "thumbs up" and "thumbs down" functions, respectively. These two functions are used to indicate the user's preference for the content that is currently being displayed. "Thumbs up" means the user likes the content and "thumbs down" indicates the opposite. In certain embodiments, the user may hit the keys multiple times to indicate the degree of preference. For example, hitting "thumbs up" multiple times consecutively indicates that the user really likes what is playing, hitting "thumbs up" once means the user is okay with what is playing, and hitting "thumbs down" multiple times means the user really dislikes what is playing. The preference information is saved. In some embodiments, when the item names are displayed, the items that have higher positive preference are displayed on top.

The 2 key turns the volume up and the 8 key turns the volume down. The 7 key mutes the volume when it is pressed for the first time. Pressing 7 a second time turns muting off. The 4 key is for rewinding and the 6 key is for fast forward. The 5 key is a modal key that controls two different functions: play and pause. In one embodiment, when certain content is ready to be played, hitting the 5 key starts to play the content. During the play, hitting the 5 key again pauses it. The 9 key implements the stop function. The 0 key maps to a launch disc function used for quickly starting DVD movies or other media. The pound key (#) disconnects the phone from the computer when the phone connects to the computer via a dial up connection.

In certain embodiments, the user presses the star key multiple times to enter a different function and keypad mapping. Keypad 202 maps the keys to a set of navigation functions. The 1 key maps to a home function that brings the user back to the beginning of the currently displayed content. The 7 key maps to an end function that brings to the end of the currently displayed content. The 2, 8, 4 and 6 keys correspond to up, down, left and right functions, respectively. The 3 and 9 keys correspond to the page up and page down functions respectively. The 5 key maps to an enter function. The 0 key selects one item, and the pound key selects all the items listed. The star key is still the activation key, and pressing it one more time brings the keypad mapping back to that of 200.

In certain embodiments, the telephone, the computer, or both are programmed to detect short time gap between consecutive keypad presses. The user can quickly press the same key twice ("double click"), or three times ("triple click"), to activate certain functions. For example, in one embodiment, the user enters a different function and keypad mapping by double clicking on the star key.

Figure 3:
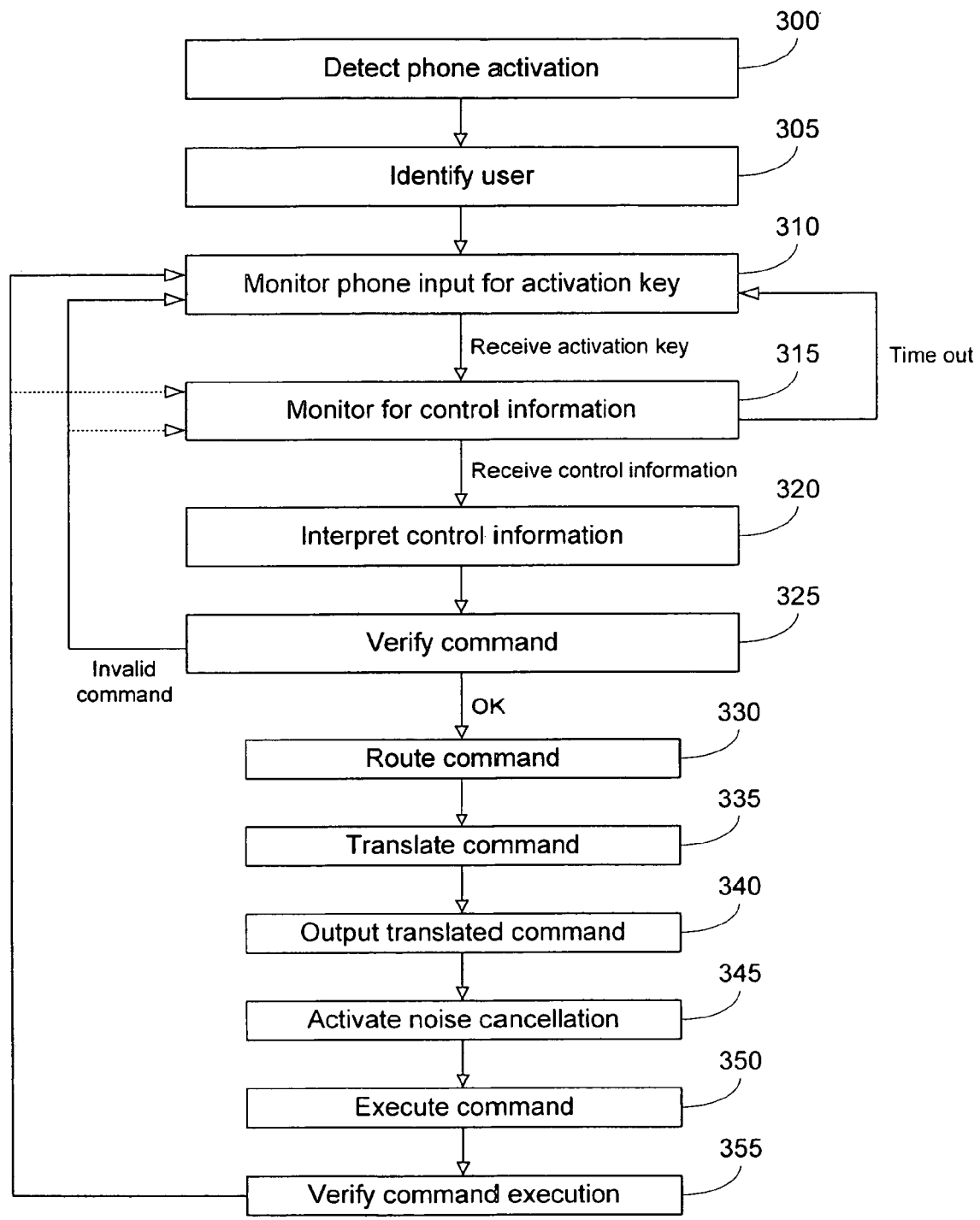
FIG. 3 is a flowchart illustrating the operating steps of the system.

FIG. 3 is a flowchart illustrating the operating steps of the system. The flowchart starts at 300, where the computer detects that the phone has been activated. In some embodiments, the computer detects that the phone has been activated when it receives a call made from the telephone. In other embodiments, the activation may be indicated as a signal, such as the dial tone, sent to the computer when the phone is off the hook. Other activation signals may include a signal from an intercom or a TCP/IP ping.

305 is an optional step for identifying the user. The identification can be done in many different ways. In one embodiment, the identification is simply the phone that is used. In another embodiment, the user is prompted to enter a password. In other embodiments, the identification can be done using biometrics, such as the user's voiceprint.

After the user has been identified, the system monitors input from the phone for an activation key at 310. The monitoring can be done either by the computer or the phone itself. This is an optional step that puts the system in a mode ready for receiving control information input. The activation key can be a designated key on the keypad, such as the star key described in a previous embodiment. A sequence of keys may also be used. It can also be a special phrase or keyword spoken by the user, for instance the word "select". After receiving the activation key, flow control is transferred to the next step shown in step 315.

At 315 the system monitors for control information. The control information includes a series of keys entered by the user, or a sequence of words spoken, or both. In embodiments where step 310 is implemented, if there is no user input after a timeout period has passed, flow control is transferred from step 315 back to step 310. Upon receiving the control information, flow control is transferred to step 320.

At 320 the system interprets the control information received. In one embodiment, the control information sent is a series of keys. The computer processes the information to determine which command(s) the keys correspond to. For example, the information may be "222", which corresponds to turning the volume up three notches. In another embodiment, the control information is a sequence of words spoken by the user. The computer's voice recognition software parses the sound signals it receives to determine the corresponding command(s). For example, to play a song titled "Let it be", the user may say "music let it be". Details of this step are discussed later.

At 325 the system verifies the command. This step will be discussed in detail later. If the command is determined to be invalid, flow control is transferred back to step 310 if 310 is implemented, or to step 315 if 310 is omitted. If the command is determined to be valid, flow control is transferred on to next step 330. The system provides feedback to the user as the command is being verified. The feedback can be provided visually on the output, audibly on the output, visually on the user's telephone, audibly on the user's telephone, or using a combination of these techniques.

At 330 the command is routed to an appropriate media source. For example, if the user has sent a command to play a song stored on a CD in a jukebox, the command is routed to the CD jukebox that contains the CD. In the following step 335, the command is translated to a code that is understood by the device to which the command is routed.

At 340 the computer outputs the translated command to the appropriate device. Once the device starts to play the content, the user's voice input may be drowned out by the noisy background. Thus, noise cancellation may be activated by an optional step 345. Steps 340 and 345 are described in more detail later.

At 350 the device executes the command, upon receiving the code from the computer. At 355, the execution of the command is verified. At this point, flow control is transferred back to step 310 if available, otherwise to step 315.

Figure 4:
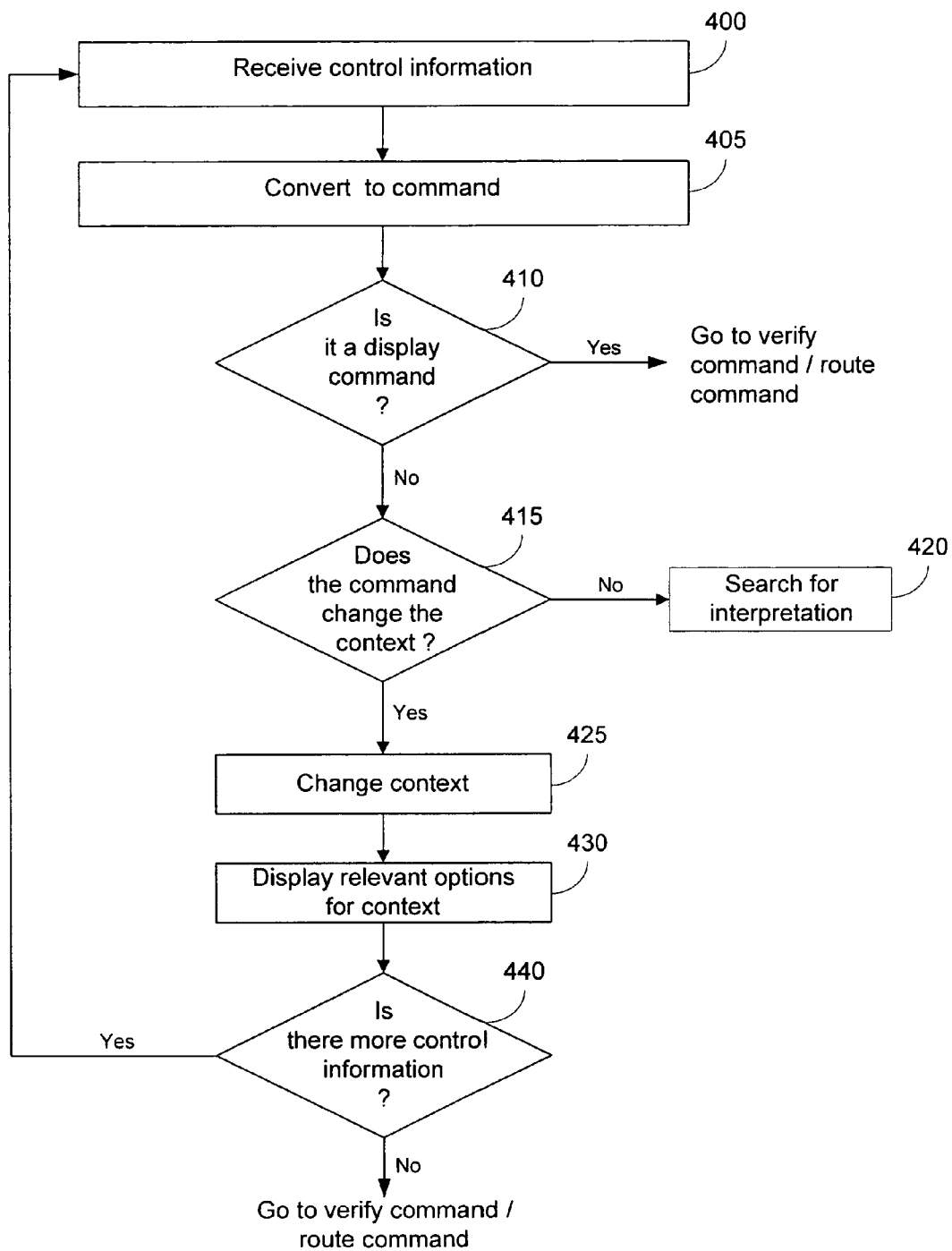
FIG. 4 shows details of the interpret control information step.

FIG. 4 shows details of the "interpret control information" step 320. At 400, the control information is received by the computer. Next, at 405, the information is converted to a command. As previously noted, the conversion is done on either key inputs or voice inputs. Step 410 determines whether the command is a display command, i.e., a command for the device to perform some kind of display function, including play, rewind, fast forward, volume up and down. If the command is determined to be a display command, flow control is transferred to step 310 if available, otherwise to step 315. If the command is not a display command, it is examined at step 415 to determine whether it changes the context of the current system.

The context of the system determines what options are available to the user. Examples of context changing command include commands that select different categories of content, such as "music", "movie", etc. A context changing command leads to step 425, where the context is changed. A non-context changing command leads to step 420, where the interpretations of the command are searched and displayed. Details of step 420 are discussed below.

At 430 relevant options for the current context are displayed. For example, in one embodiment, if the command is "system", the relevant options are "music" and "movies". If the command is "music", the relevant options are a listing of all the albums stored in the media source. If the command is the title of one album, the relevant options are all the tracks in that album. In other embodiments, the relevant options associated with the commands may vary.

At 440 the system checks to see whether there is more control information available from the user input. If there is more information, flow control is returned to step 400 to repeat the process. If no more information is available, flow control is sent to step 325 if available, and otherwise to step 330.

Figure 5:
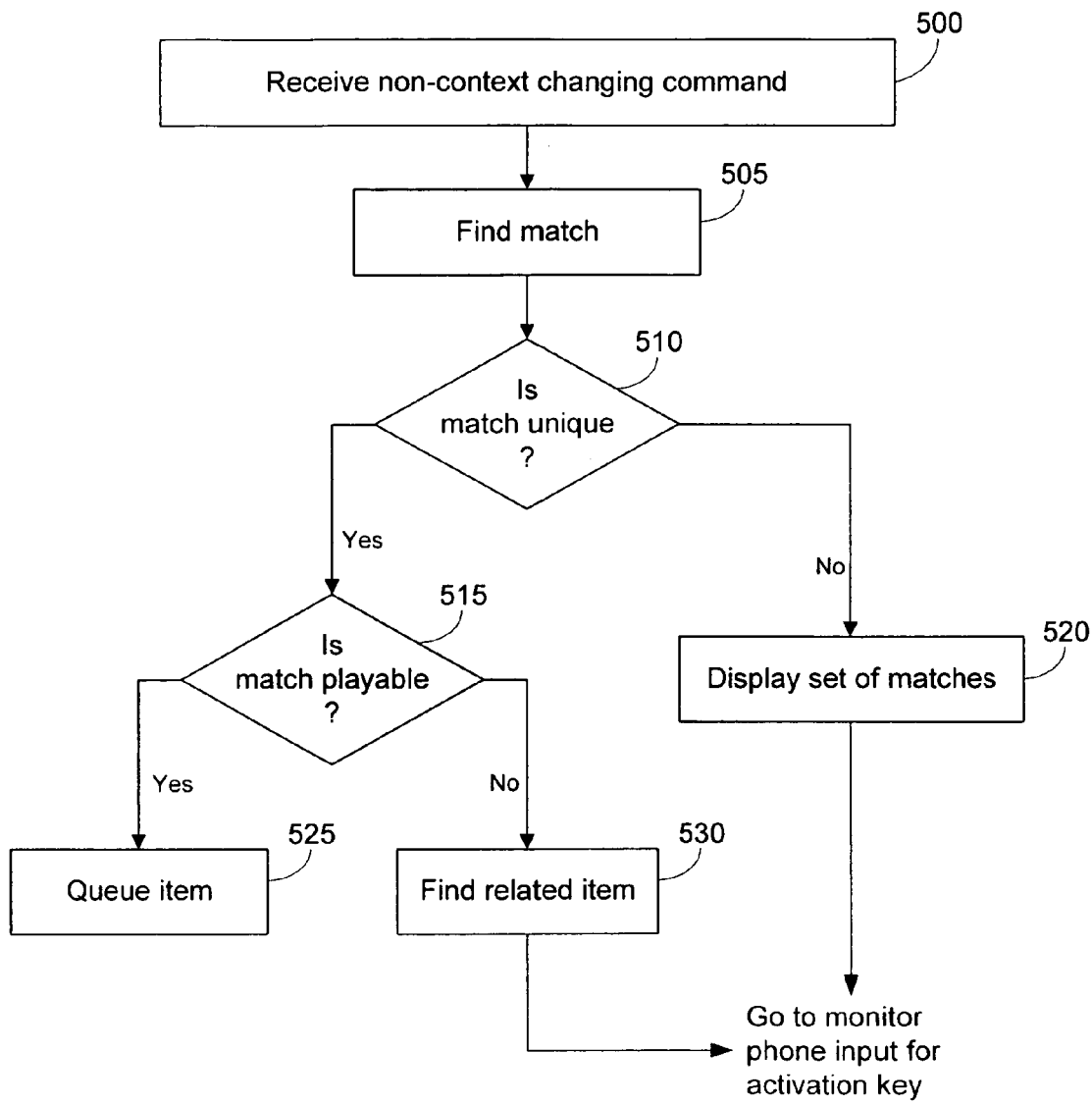
FIG. 5 illustrates details of the search for interpretation step.

FIG. 5 illustrates details of the "search for interpretation" step 420. At 500, a non-context changing command is received. Examples of such commands include commands for searching certain items based on certain criteria. At 505, the system searches for items that match the command. At 510 the system determines whether there is a unique match. If there is not a unique match, the set of search results are displayed, and flow control returns to step 315 if available, otherwise to step 320. For example, the command may be the name for a band, and the system searches for the band name and returns the album titles by that band stored on the media source. In one embodiment, the system displays the search results sorted by user preference, with the most favorite ones listed on top. In one embodiment, the items the user has not played previously are listed first. In certain embodiments, the search results are displayed alphabetically.

In one embodiment, the system displays increasingly more search results while awaiting the user's input. Initially, only a few of the search results are displayed. As the user waits to make a selection, a few more results are added to the display every few seconds, until all the results are displayed or until the user makes a selection. This is a useful feature when there are many search results.

If a unique match is found from step 510, flow control is transferred to step 515 where the system determines whether the match is playable. If the match is playable, the item is queued in step 525 to be played. If the match is not playable, items relating to the match found are displayed in step 530. Flow control is then transferred back to step 315 if available, otherwise to step 320.

Figure 6:
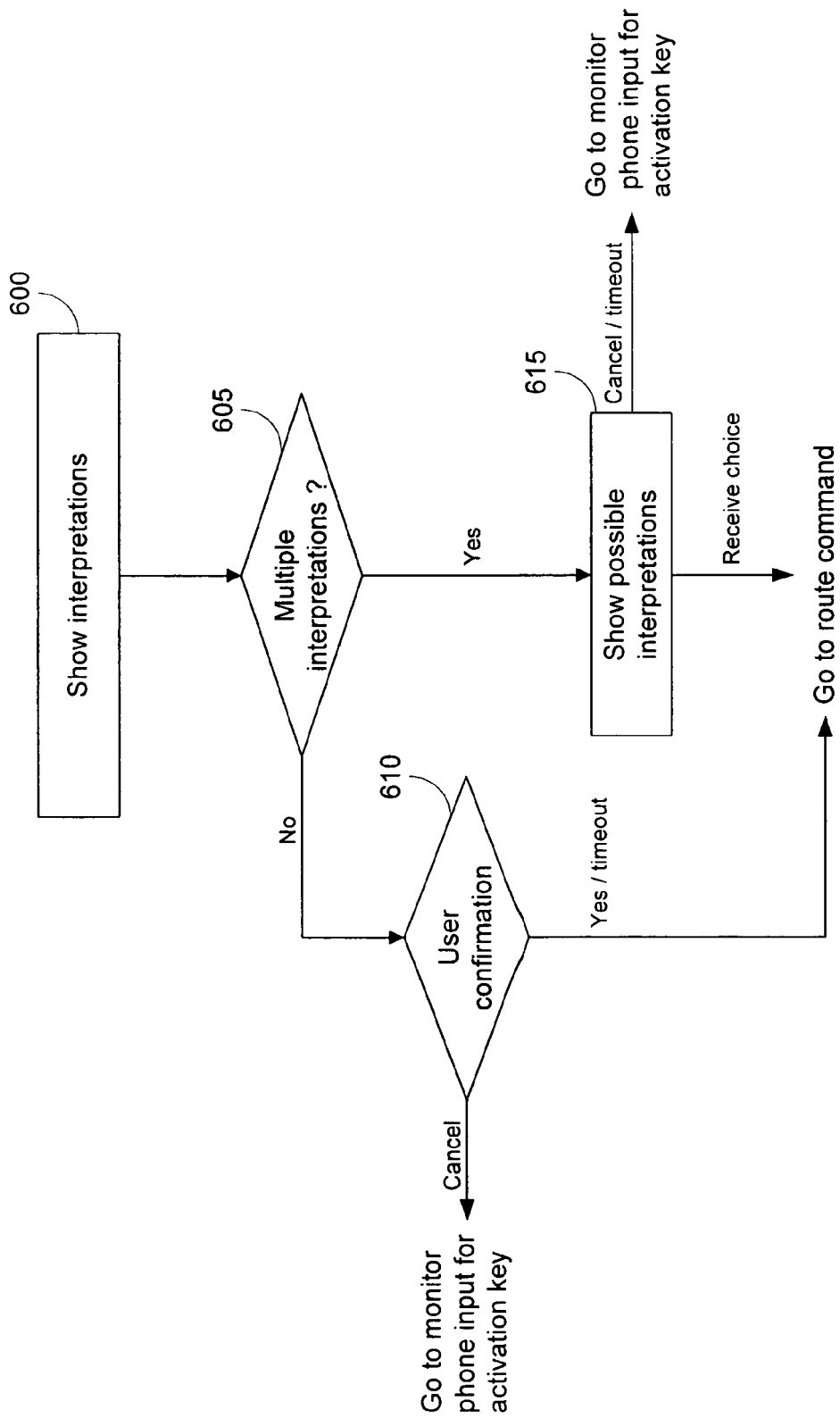
FIG. 6 illustrates details of the verify command step.

FIG. 6 illustrates details of the "verify command" step 325. This is an optional step useful when there are multiple interpretations to a command. For example, a user may select the same alias for more than one media title. Thus, a command of such an alias results in multiple interpretations. For example, two movies titled "The Sixth Sense" and "Sense and Sensibility" may both be given the same alias by a user, "sense". When the user says the command "sense" in the movie context, both titles are noted as interpretations of this alias command.

At 600 all the interpretations for a command are shown to the user. In one embodiment, the interpretations are displayed visually on the output. In one embodiment, the interpretations are displayed audibly on the output. In certain embodiments, the interpretations are sent to the user's telephone, which displays the interpretation information appropriately. In some embodiments, a combination of the above techniques is used to show the interpretations.

At 605 the system determines whether there are multiple interpretations. If multiple interpretations exist, such as described in the alias example above, all the possible interpretations are shown to the user at step 615. If the user selects an item from the interpretations shown, for example, "The Sixth Sense" from two titles both aliased to "Sense", flow control is transferred to route command step 330. If the user cancels the command, or the system times out before the user takes any further action, flow control is transferred to step 310 if available, otherwise to step 315.

If there is only a single interpretation, at step 610 the user is given a chance to confirm that this is indeed the selection he has in mind. If the user confirms the selection, flow control is transferred to step 330 where the command is routed. In one embodiment, if the user does not take any further action, and the system times out, flow control is also transferred to step 330. If the user cancels, flow control is transferred to step 310, or step 315 if step 310 is unavailable.

Figure 7:
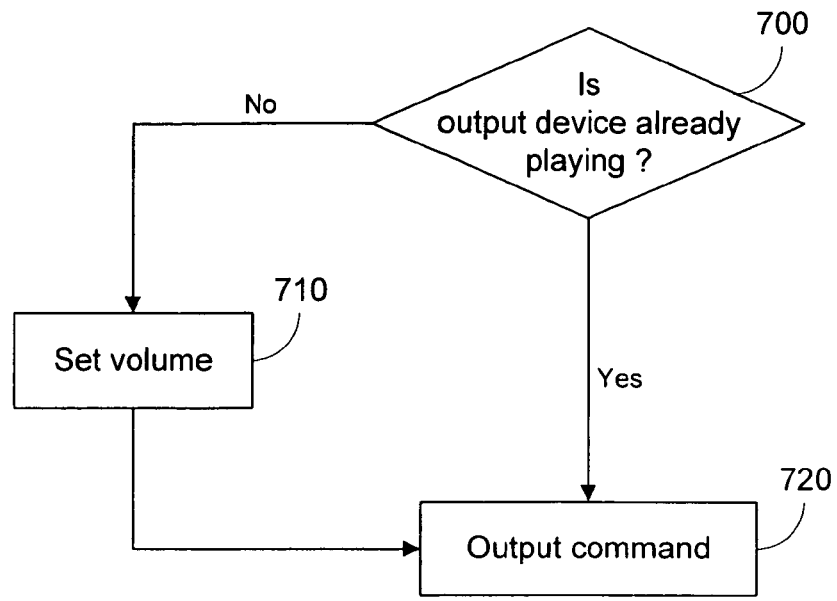
FIG. 7 illustrates details of the outputting translated command step.

FIG. 7 illustrates details of the "outputting translated command" step 340. This step adjusts the output volume before starting to play the output. At step 700, the system checks whether the output device is already playing. If the output device is already playing, no adjustment needs to be made and the command is output at step 720. Otherwise, the volume of the output device is set to a mid range level at step 710 so that once the device starts to play the volume is not too high or too low.

When the user uses voice to send control information, the audio output of the currently playing content creates feedback that interferes with the processing of the voice commands. In some embodiments, both the computer and the output device receive the audio signal to be played. It is desirable to take advantage of this fact to cancel the background noise due to feedback, so that the user's voice is more effectively processed.

Figure 8:
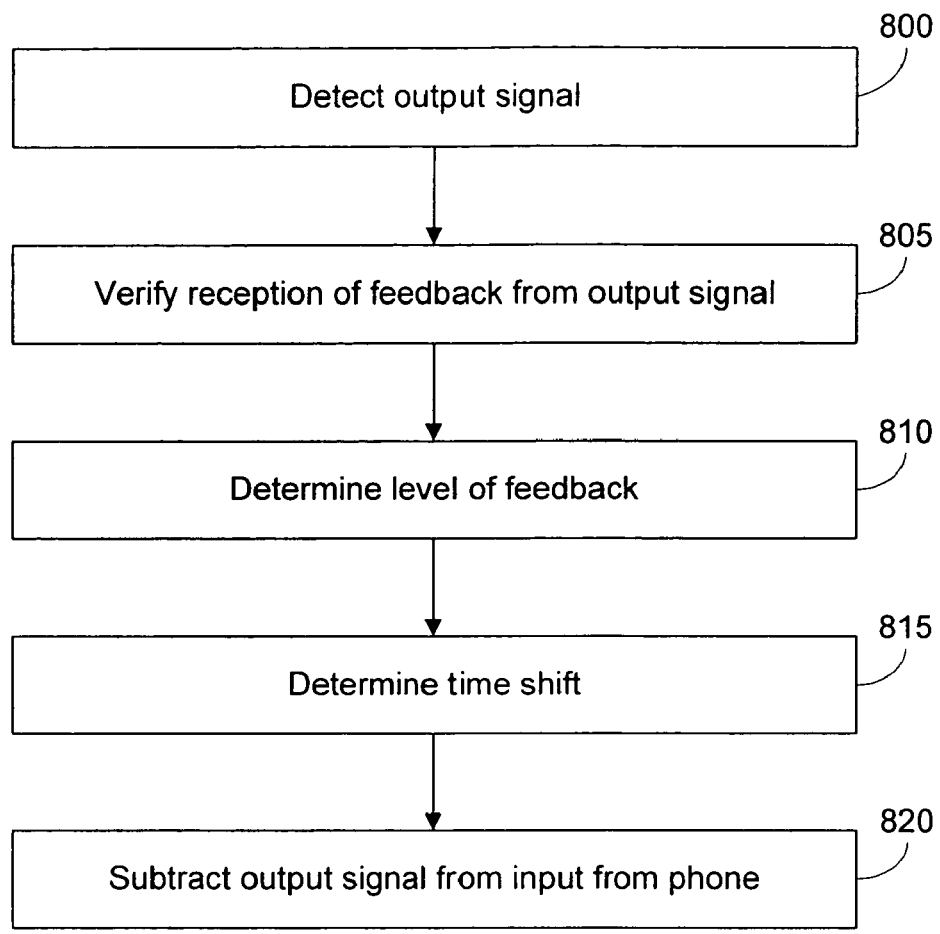
FIG. 8 illustrates details of the optional activate voice cancellation step.

FIG. 8 illustrates details of the optional "activate voice cancellation" step 345. In this embodiment, the input signal includes the user's voice and feedback from the output signal. At 800 the system detects the output signal. At 805 the system receives feedback due to the output signal, and the reception is verified. At 810 the system determines the level of feedback. At 815 the system determines the time shift of the feedback signal relative to the original output. In one embodiment, the time shift is determined by comparing samples of the feedback signal with samples of the original output. At 820, the time shift is used to align the input signal and the output signal. Once the signals are aligned, the output signal is subtracted from the input to produce a clean version of the user's voice input. In other embodiments, other noise cancellation techniques are used.

Figure 9:
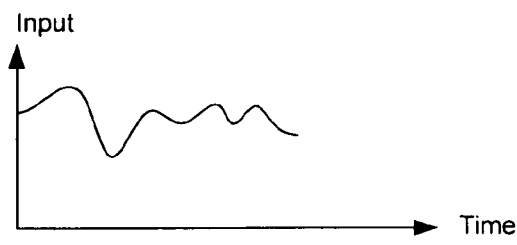
FIG. 9 shows an example of the noise cancellation process described above. The top diagram is an output waveform.
Figure 9:
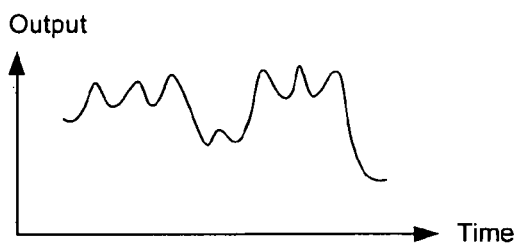
Figure 9:
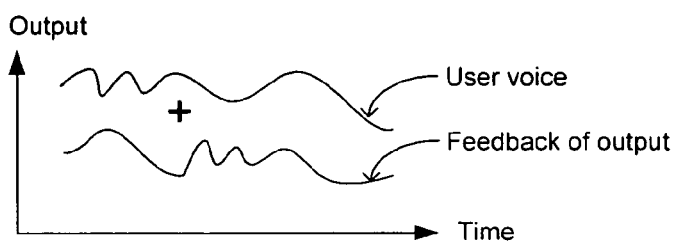
Figure 9:
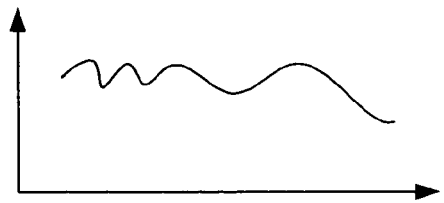

FIG. 9 shows an example of the noise cancellation process described above. The top diagram is an output waveform. The second diagram is an input waveform. The third diagram shows the decomposition of the input waveform, which includes the user's voice signal and a time delayed output signal that is the feedback. The last diagram shows the input after the noise cancellation process cancels out the feedback, leaving a clean version of the user's voice signal.

Figure 10:
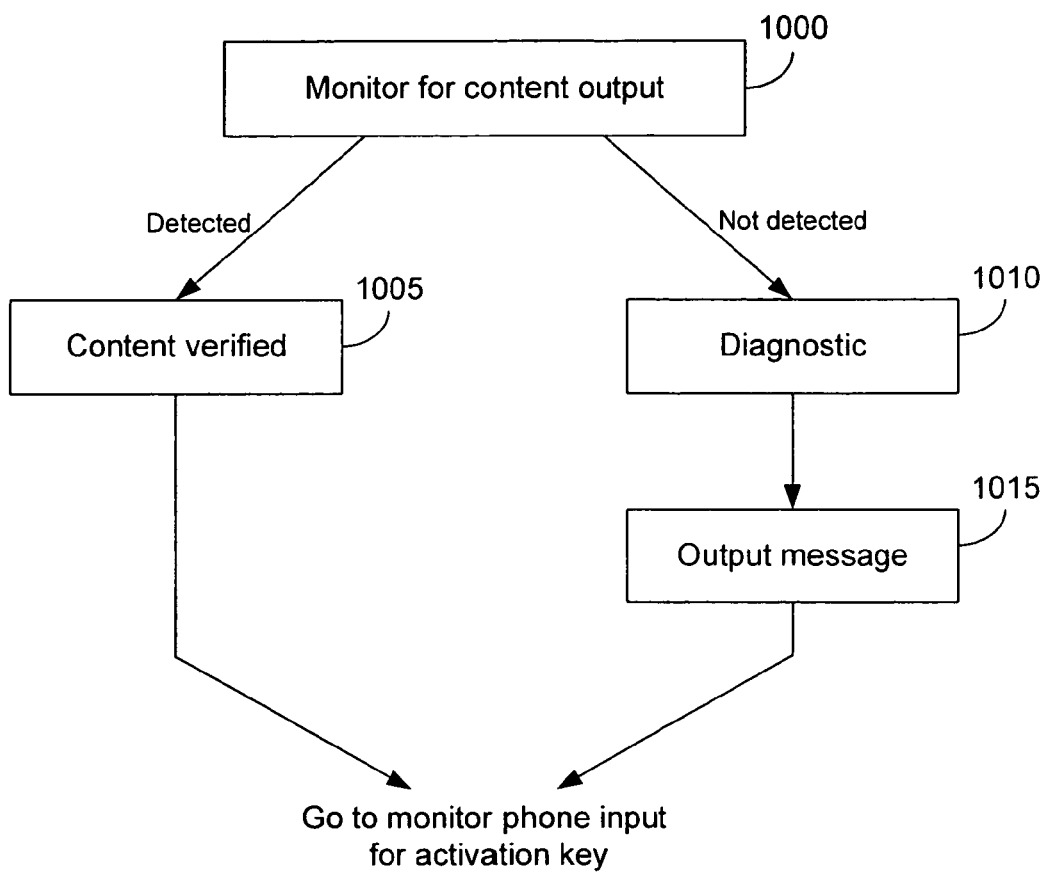
FIG. 10 illustrates details of the verify command execution step.

FIG. 10 illustrates details of the "verify command execution" step 355. At 1000 the system monitors for content output. If the system detects an output signal, then it assumes that the command execution has succeeded and system operation is normal. The content is verified at step 1005. If the system does not detect an output signal, flow control is transferred to a diagnostic step 1010. In one embodiment, in the diagnostic step, the system polls the media source and the output device to find out what is not working and why. In step 1015, the system outputs the diagnostic result either visually or audibly.

Figure 11:
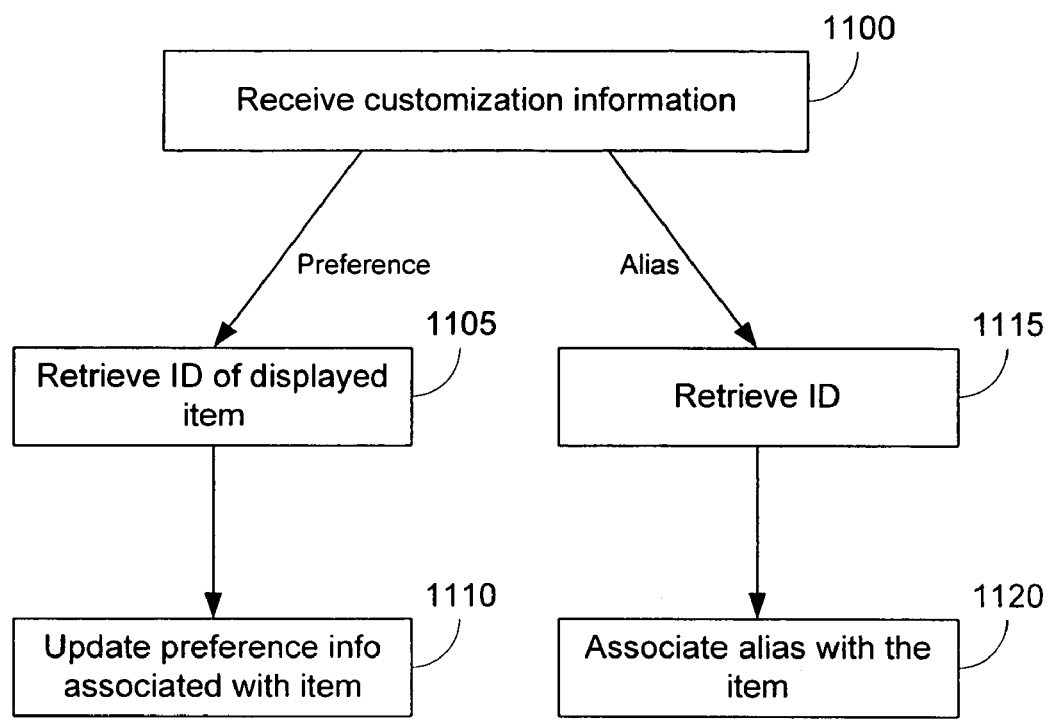
FIG. 11 illustrates the process used to handle customization information.

FIG. 11 illustrates the process used to handle customization information. The customization information is based on the user, and includes preferences and aliases for items. At 1100, the user inputs customization information that is received by the system. The system determines whether the information is preference or alias. If the information received is preference, flow control is transferred to step 1105, where the identification for the item displayed is retrieved. At 1110, the preference information associated with the item is updated. If the information is alias, flow control is transferred to step 1115, where the identification for the item displayed is retrieved. At 1120, the alias information is associated with the item and stored.

Thus, the phone control system provides considerable flexibility in accessing media content. Media may be selected by name, partial name, metadata attribute including artist, writer, producer, director, actor name or partial name, album or series name or partial name or any combination of these. A media category such as movie, song, TV show or media to purchase may be specified to aid in locating the correct content and related content. The phone control enables control of numerous entertainment devices, including televisions, stereo amplifiers and multichannel decoders, CD and DVD players, changers, and jukeboxes, TV set-top boxes for cable TV or satellite TV, PVR devices, Digital music jukeboxes including compressed digital music (MP3/WMA) players, Digital video jukeboxes including compressed digital video players (DivX/WMV/MPEG) or a computer functioning as any of the above devices.

A telephone controlled media system has been disclosed. The system uses a telephone to control a media source. The user controls the system using voice, telephone keypad, or both. The system design simplifies the problem of managing various media information and electronic entertainment devices, and supports advanced features for managing the user's media contents.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of controlling the presentation of information using a telephone comprising:
    monitoring a signal received from the telephone, wherein the telephone is used to send control information to a plurality of media sources;
    receiving control information sent from the telephone, wherein a first subset of the control information is for a first media source and a second subset of the control information is for a second media source, and wherein the telephone is used to provide device specific control information based on a media source device type;
    interpreting the control information based on the media source device type;
    generating a first subset of commands for the first media source based on the first subset of the control information, and generating a second subset of commands for the second media source based on the second subset of the control information;
    routing the first subset of commands and the second subset of commands based on the media source device type;
    sending the first subset of commands to the first media source wherein the first media source outputs information based on the first subset of commands, and sending the second subset of commands to the second media source wherein the second media source outputs information based on the second subset of commands; and
    displaying the information output from the first media source and the second media source on a device separate from the telephone.

2. A method of controlling the presentation of information using a telephone as recited in claim 1 wherein the information is entertainment media.

3. A method of controlling the presentation of information using a telephone as recited in claim 1 wherein the control information includes voice instructions.

4. A method of controlling the presentation of information using a telephone as recited in claim 1 wherein the control information includes information entered from a keypad associated with the telephone.

5. A method of controlling the presentation of information using a telephone as recited in claim 1 wherein the control information includes information entered from an input device associated with the telephone.

6. A method of controlling the presentation of information using a telephone as recited in claim 1 wherein the control information includes voice instructions and information entered from the telephone's keypad.

7. A method of controlling the presentation of information using a telephone as recited in claim 1 wherein:
    the control information includes information entered from the telephone's keypad; and
    the signal received from the telephone is a dual tone multi-frequency (DTMF) tone.

8. A method of controlling the presentation of information using a telephone as recited in claim 1 wherein:
    the control information includes information entered from the telephone's keypad; and
    the signal received from the telephone is a signal overlaid on regular audio signals being transmitted and received by the telephone.

9. A method of controlling the presentation of information using a telephone as recited in claim 1 further including detecting activation of the telephone.

10. A method of controlling the presentation of information using a telephone as recited in claim 1 wherein:
    the control information includes information entered from the telephone's keypad;
    the keypad maps to a set of control functions based on the selected media source device type.

11. A method of controlling the presentation of information using a telephone as recited in claim 1 wherein the control information includes information entered from the telephone's keypad and further including detecting short time gap between a plurality of consecutive keypad presses and activating a function based on the plurality of keypad presses.

12. A method of controlling the presentation of information using a telephone as recited in claim 1 wherein: the control information includes information entered from the telephone's keypad;
    the keypad maps to a set of control functions;
    key 2 on the keypad maps to an up function;
    key 8 on the keypad maps to a down function;
    key 4 on the keypad maps to a left function;
    key 6 on the keypad maps to a right function; and
    key 5 on the keypad maps to an enter function.

13. A method of controlling the presentation of information using a telephone as recited in claim 1 wherein the control information includes user preference.

14. A method of controlling the presentation of information using a telephone as recited in claim 1 wherein:
    the control information includes information entered from the telephone's keypad;

the control information comprises user preference; and
a degree of the user preference is indicated by pressing a preference key multiple times.

15. A method of controlling the presentation of information using a telephone as recited in claim 1 further including identifying a user.

16. A method of controlling the presentation of information using a telephone as recited in claim 1 further including identifying a user by using a password.

17. A method of controlling the presentation of information using a telephone as recited in claim 1 further including identifying a user by identifying the telephone.

18. A method of controlling the presentation of information using a telephone as recited in claim 1 further including identifying a user by using biometrics.

19. A method of controlling the presentation of information using a telephone as recited in claim 1 further including:
    identifying a user; and
    storing and retrieving a set of customization information based on the user.

20. A method of controlling the presentation of information using a telephone as recited in claim 1 wherein the signal received from the telephone includes an activation key.

21. A method of controlling the presentation of information using a telephone as recited in claim 1 wherein:
    the signal received from the telephone includes an activation key; and
    the activation key is a special key on the telephone's keypad.

22. A method of controlling the presentation of information using a telephone as recited in claim 1 wherein:
    the signal received from the telephone includes an activation key; and
    the activation key is a special phrase.

23. A method of controlling the presentation of information using a telephone as recited in claim 1 further including verifying the commands.

24. A method of controlling the presentation of information using a telephone as recited in claim 1 further including verifying the commands and displaying feedback on the verified commands.

25. A method of controlling the presentation of information using a telephone as recited in claim 1 further including canceling noise by subtracting from the control information a time shifted version of information output from the media source.

26. A method of controlling the presentation of information using a telephone as recited in claim 1 wherein the commands include a context changing command based on the selected media source device type.

27. A method of controlling the presentation of information using a telephone as recited in claim 1 wherein the commands include a display command.

28. A method of controlling the presentation of information using a telephone as recited in claim 1 wherein the commands include a search command.

29. A method of controlling the presentation of information using a telephone as recited in claim 1 further including displaying increasingly more search results.

30. A method of controlling the presentation of information using a telephone as recited in claim 1 wherein the control information includes aliases for the information output from the media source.

31. A method of controlling the presentation of information using a telephone as recited in claim 1 further including verifying whether displaying the information has succeeded.

32. A telephone controlled media system comprising:
    a telephone used to send control information to a plurality of media sources;
    a computer connected to the telephone for receiving the control information, wherein a first subset of the control information is for a first media source and a second subset of the control information is for a second media source, and wherein the telephone keypad is used to provide device specific control information based on a media source device type, interpreting control information based on the media source device type, generating a first subset of commands for the first media source based on the first subset of the control information, and generating a second subset of commands for the second media source based on the second subset of the control information, routing the first subset of commands and the second subset of commands based on the media source device type, and sending the first subset of commands to the first media source and sending the second subset of commands to the second media source;
    wherein the first media source outputs information based on the first subset of commands, and the second media source outputs information based on the second subset of commands; and
    an output device separate from the telephone for displaying the information from the first media source and the second media source.

33. A method of controlling the presentation of information using a telephone comprising:
    monitoring a signal received from the telephone, wherein the telephone is used to send control information to a plurality of media sources;
    receiving control information sent from the telephone, wherein a first subset of the control information is for a first media source and a second subset of the control information is for a second media source, and wherein an interface of the telephone is used to provide device specific control information based on a media source device type;
    interpreting the control information based on the media source device type;
    generating a first subset of commands for the first media source based on the first subset of the control information, and generating a second subset of commands for the second media source based on the second subset of the control information;
    routing the first subset of commands and the second subset of commands based on the media source device type;
    sending the first subset of commands to the first media source wherein the first media source outputs information based on the first subset of commands, and sending the second subset of commands to the second media source wherein the second media source outputs information based on the second subset of commands; and
    displaying information output from the first media source and the second media source on the telephone.

34. A method of controlling the presentation of information using a telephone as recited in claim 33 wherein the interface of the telephone includes a touch screen with a display for presenting a virtual keypad.

35. A method of controlling the presentation of information using a telephone as recited in claim 33 wherein the interface of the telephone includes a touch screen with a display for presenting a touch keypad.

36. A method of controlling the presentation of information using a telephone as recited in claim 33 wherein the interface of the telephone includes a touch screen with a display for presenting a plurality of virtual keys.

37. A method of controlling the presentation of information using a telephone as recited in claim 33 wherein the telephone includes a voice recognition component that captures a user's voice signal and decodes the voice signal to determine the user's command input.

\* \* \* \* \*